Patented Oct. 26, 1954

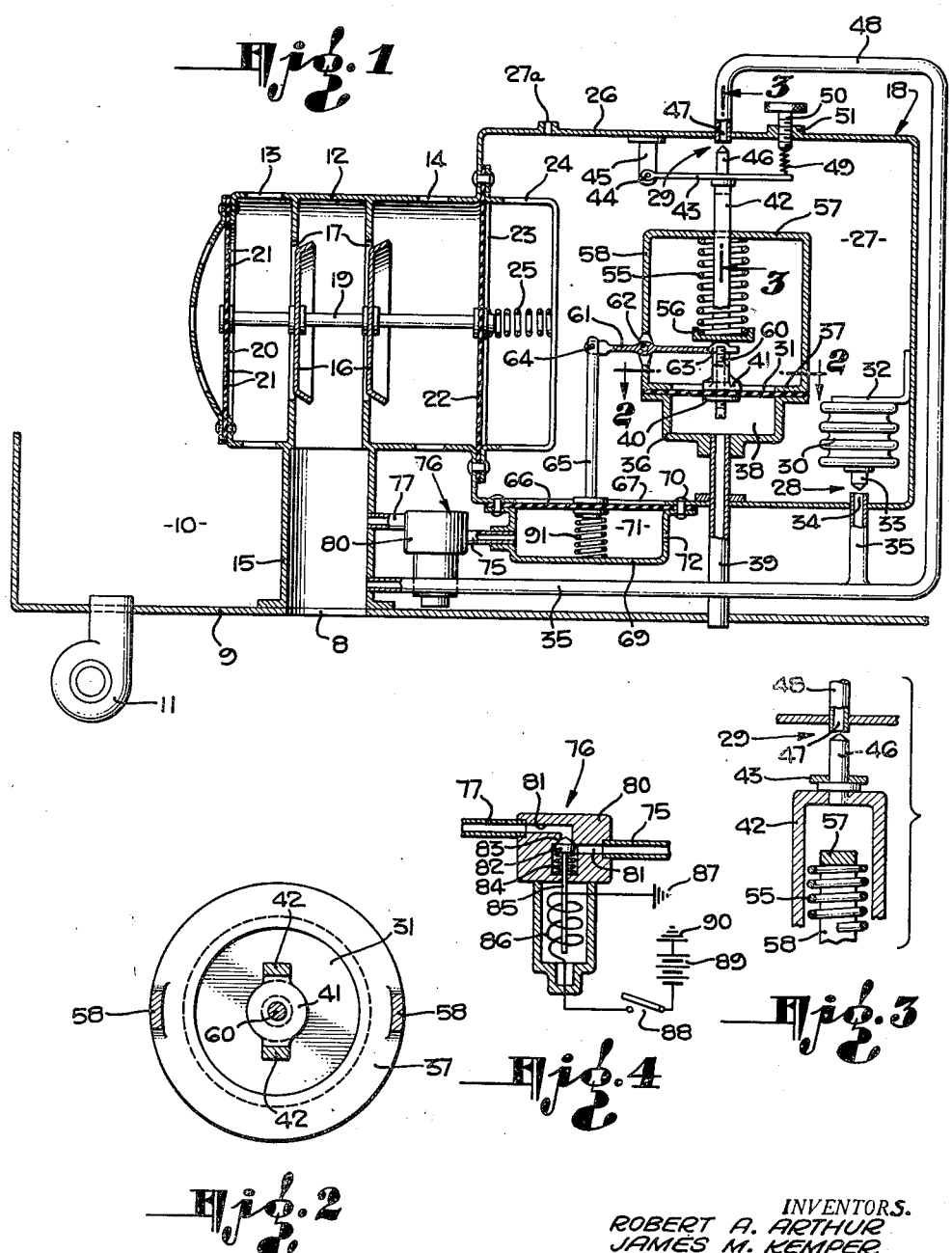

2,692,545

UNITED STATES PATENT OFFICE 2,692,545

PRESSURE REGULATING MECHANISM

Robert A. Arthur, Los Angeles, James M. Kemper, Hollywood, and Richard A. Fischer, Los Angeles, Calif., assignors to The Garrett Corporation, Los Angeles, Calif., a corporation of California Application March 20, 1950, Serial No. 150,582

17 Claims. (Cl. 98—1.5)

This invention relates to apparatus for controlling the pressure within an enclosure, such as an aircraft cabin or the like, which is supplied with air under pressure by pump, a supercharger, ram, or the like.

The invention is particularly applicable to military aircraft, in which a number of serious problems are met with in the event of a major perforation of the wall of a pressurized cabin during combat operations. If the area of perforation is sufficiently large, the cabin pressure will drop at such a rate that the occupants of the cabin cannot maintain normal bodily and mental functioning.

The problem of maintaining rational functioning of the military personnel of a combat plane under such conditions can be solved by providing equipment for the controlled supply of breathing oxygen, and such equipment is available. Thus a plane may continue to operate at altitudes above the limit where ambient atmosphere is capable of furnishing an adequate oxygen supply for breathing purposes. However, such equipment does not solve the other problems mentioned above. The seriousness of these problems is proportional to the magnitude of the ratio of cabin to ambient pressure for which the pressure regulating apparatus is set to operate at the higher altitudes. Consequently, these problems may be dealt with by providing, for use in conjunction with the oxygen apparatus, means for reducing the differential and thus the aforesaid ratio during combat operations, and therefore, an object of the present invention is to provide a pressure regulating mechanism including means whereby the differential between cabin and ambient pressure normally called for at high altitudes may be temporarily reduced, for combat operations, to a predetermined minimum and may subsequently be restored to its normally high level.

Another object of the invention is to provide a pressure regulating system incorporating a differential changer, the operation of which may be initiated manually by the pilot through electrical means, and which will then automatically change the differential from a predetermined high limit to a predetermined low limit, or vice versa, depending upon the direction in which the manual control is set for operation.

Still another object of the invention is to provide a system of this character wherein the changer mechanism includes a simple electrically operated valve, the electrical control means being manually controlled.

Another object of the invention is to provide a differential changing control which is adapted to override a control which normally operates to maintain a fixed (normal) differential between cabin and ambient pressures in at least one stage of operation of the regulating system. Thus the regulator would normally maintain a maximum differential in this stage of operation, but would be adapted, under manual control, to shift from high to low and back to high differential, at the discretion of the crew, while operating under external atmospheric conditions normally calling for high differential.

While not limited thereto, the invention is particularly applicable to a commonly used method of pressurizing in which cabin pressure is permitted to remain substantially the same as atmospheric pressure until a predetermined altitude has been reached, is maintained at a substantially constant level between that altitude and a second predetermined and higher altitude, and, above said second predetermined altitude, is maintained at a substantially fixed normal differential relative to external atmosphere. In actual operation in such a system, the differential changer will override not only the normal differential control, but also the isobaric control in that portion of the isobaric range wherein there is developed a differential of cabin over ambient pressure exceeding the minimum differential limit determined by the differential changer of the present invention.

Further objects and advantages of the invention will be brought out in the following part of the specification.

Referring to the drawings which are for illustrative purposes only,

Fig. 1 is a generally schematic view in section of a regulating system embodying the invention;

Fig. 2 is a sectional view taken on line 2—2 of Fig. 1;

Fig. 3 is a sectional view taken on line 3—3 of Fig. 1; and

Fig. 4 is a diagrammatic sectional view of the electrically operated valve which controls the differential pressure changer.

Referring more particularly to the drawings, the regulating system embodies a regulator adapted to control the outflow of air through an outlet 8 in the wall 9 of an aircraft cabin 10, air being pumped into the cabin under pressure by any suitable means such as a pump or supercharger 11. The regulator is adapted to be disposed within the cabin 10 and includes generally a valve casing 12 into which cabin air flows through openings 13 and 14, an outlet duct 15 being connected to the outlet 8 for discharging air from the cabin. A pair of valve elements 16 controls valve apertures 17 through which air may flow from the valve casing to the duct 15, and control mechanism, indicated generally at 18.

The valves 16 are carried by a shaft 19 which is supported between a flexible support member 20 (comprising one or more spiral shaped webs separated by slots 21) and a flexible diaphragm 22 which is clamped to one end of the casing 12 by any suitable means such as an annular ring 23, which has a yoke 24 extending diametrically in spaced relation to the diaphragm 22. A spring 25 reacts between the yoke 24 and the diaphragm 22 and urges said diaphragm in a direction to effect closing of the valves 16.

The regulator also includes a casing section 26 which defines a control pressure chamber 27, one side of the diaphragm 22 being subjected to the pressure in said control chamber while the opposite side of said diaphragm is subjected to enclosure or cabin pressure. The pressure in the control chamber 27 is such that the resultant force against the diaphragm 22 plus the force of the spring 25 equals the force resulting from cabin pressure against the other side of said diaphragm. Thus the diaphragm 22 responds to variations in the differential of pressure between that in the cabin exerted against the left side (as viewed in Fig. 1) and the pressure of air in the control chamber 27 supplemented by the force of the spring 25 exerted against the right side of said diaphragm. Any tendency of cabin pressure to drop below the level determined by the pressure in the control chamber 27 will result in movement of the diaphragm 22 in the valve closing direction, thus causing the cabin pressure to build up or rise to the proper level. Conversely, any excess of cabin pressure will result in valve opening movement, permitting the cabin pressure to drop back to the level determined by the pressure in the control chamber 27.

Air enters the control chamber 27 through a bleed opening or passage 27a from a source of higher pressure, shown herein as the aircraft cabin 10, and the pressure in the control chamber 27 is controlled by pilot valves, indicated generally at 28 and 29 respectively, said pilot valves being adapted to bleed excess pressure from the chamber 27 in accordance with the response of a pair of pressure responsive devices 30 and 31. The pressure responsive device or element 30 is shown as comprising a sealed, evacuated bellows which is responsive to the absolute pressure existing in the chamber 27. One end of the bellows is anchored to a bracket 32 which is secured to the casing 26 by any suitable means. The opposite end of the bellows 30 is movable and carries a valve member 33 cooperable with an outlet opening 34, connected with a tube 35, the latter leading to the duct 15, and thus providing a connection between the chamber 27 and ambient atmospheric pressure.

The pressure sensitive element 31 is shown as comprising a diaphragm marginally clamped to the open end of a housing 36 by means of an annular ring 37. The housing 36 defines, with the diaphragm 31, a chamber 38 connected to atmosphere by means of a conduit 39 so that one side of said diaphragm 31 is subjected to ambient atmospheric pressure. The opposite side of the diaphragm 31 is exposed to the pressure in the control chamber 27, and said diaphragm 31 responds to variations in the differential of pressure on opposite sides thereof. In other words, the diaphragm 31 responds to variations in the differential of pressure between that in the chamber 27 and ambient atmosphere.

The diaphragm 31 has a central portion clamped between a washer 40 and a disc-like part 41, by any suitable means. The disc-like part 41 comprises the closed lower end, as shown in Fig. 1, of a generally O-shaped yoke or link 42 which extends upwardly and has its upper end secured to a lever 43, the latter being pivoted at 44, adjacent one end thereof, to a support 45 attached to the casing 26 by any suitable means. Intermediate the ends of the lever 43 is a needle valve 46 which cooperates with an outlet 47 connected to atmosphere by means of a conduit 48, the conduit 35, duct 15, and outlet 8. The end of the lever 43 opposite the pivot 44 has one end of a spring 49 attached thereto, the opposite end of said spring being secured to adjusting means shown as comprising a screw 50 threaded in the opening of a boss 51 formed on the casing 26.

By adjusting the tension of the spring 49, it is possible to change the differential which the valve 29 will maintain between control chamber, and hence, cabin pressure and ambient atmospheric pressure.

The above described mechanism is adapted to control the pressure within the aircraft cabin in such a manner as to maintain cabin pressure substantially the same as atmospheric pressure in an altitude range up to a predetermined value. The pilot valve 28 will then maintain the cabin pressure at a substantially constant level between said predetermined altitude and a higher predetermined altitude. Above said higher predetermined altitude a normal high differential, of substantially fixed value, will be maintained between that in the cabin and atmosphere by the differential mechanism which includes the pilot valve 29.

Means for changing the differential pressure in the chamber 27, and hence in the cabin, between a normal high and a lower value, comprises a spring 55 which reacts between a spring retainer 56 and the closed end member or part 57 of a yoke 58 which extends upwardly from the ring 37, said yoke 58 being disposed at right angles to the yoke or link 42. Under certain operating conditions hereinafter described, the spring retainer 56 is adapted to engage the adjacent end of a screw 60 threadably received in an opening through the washer 40 and part 41, said screw providing adjustment means determining the point whereat the spring retainer 56 will engage said screw 60 for loading the diaphragm 31 by said spring.

Means for controlling the spring 55 comprises a lever 61 pivoted intermediate the ends thereof at 62 to one of the arms of the yoke 58. One end of the lever 61 is forked, and the arms 63 of the fork are adapted to engage the spring retainer 56. The spacing of the arms 63 of the lever 61 is such as to permit the upper end of the screw 60 to freely pass therebetween. The opposite end of the lever 61 is pivoted at 64 to one end of a connecting member or rod 65, the opposite end of said pin being secured to a central portion of a movable wall shown as a diaphragm 66 extending over an opening 67 in the casing 26. The diaphragm 66 is marginally clamped or secured to the casing 26 by means of a flange 68 of a housing 69, said flange being secured to the casing 26 by any suitable means, shown as rivets 70.

A chamber 71 is defined by the housing 69 and the diaphragm 66, said chamber having a restricted bleed connection 72 with the cabin. Chamber 71 also has a connection with the outlet duct 15 by means of a conduit 75, valve 76 and conduit 77, so that the chamber 71 will be connected with atmosphere when the valve 76 is open.

The valve 76 includes a member 80 having a passage 81 therethrough between the conduits 75 and 77, said passage 81 being controlled by a movable valve member having a head 82 urged into cooperative seating with a valve seat 83 by a spring 84, to thereby close the passage 81. The movable valve member also includes a valve stem 85 for said head 82, said stem being received in a solenoid coil 86 having a ground 87 and adapted to be connected to a switch 88 with a source of power, shown as a battery 89 which is connected to ground at 90.

A spring 91, shown as disposed within the chamber 71, urges the diaphragm 66, rod 65, and lever 61 in a direction to disengage the fork 63 from the spring retainer 56 and to position the arms 63 in downwardly spaced relation (as shown in Fig. 1) from the spring retainer to permit operative engagement of said retainer 56 with the upper end of the screw 60 and allow the diaphragm 31 to move throughout its operative range without interference by said fork arms 63.

As shown, when the switch 88 is open, the solenoid 86 is deenergized and the valve head 82 is seated, thereby closing the connection between the chamber 71 and atmosphere. (It is to be understood, of course, that alternatively the device may be arranged so that the valve head 82 is seated when the solenoid is energized.) The pressure in chamber 71 will then be substantially the same as that in the enclosure or cabin due to the bleeding of air from the cabin into said chamber 71 through the bleed 72. Therefore, the air pressure on opposite sides of the diaphragm 66 will be substantially the same, as the pressures in the control chamber 27 and the cabin are also substantially the same. The spring 91 will therefore position the arms 63 of lever 61 in spaced relation to the spring retainer 56, so that the spring 55 will exert effective pressure on the diaphragm 31.

Assuming that the aircraft is operating in the differential range the switch 88 will normally be closed to provide the normal high differential between control chamber and ambient atmosphere. However, when switch 88 is opened the differential control means will function to maintain the low differential between the pressure in the control chamber and ambient atmosphere, and hence, the cabin and atmosphere.

When it is desired to provide the high pressure differential, the switch 88 is closed, thus effecting energization of the solenoid 86 which results in the opening of the valve 82. As a result of the opening of the valve 82, the pressure in chamber 71 will drop to substantially that of ambient atmosphere due to the fact that air in the chamber 71 will escape to atmosphere faster than it will bleed into said chamber through the restricted opening 72. The pressure in the control chamber 27 is now substantially higher than that prevailing in the chamber 71 and will cause the diaphragm 66 to move inwardly of said chamber 71 so that the arms 63 of the lever 61 will engage the spring retainer 56 and compress the spring 55 sufficiently to disengage said spring retainer 56 from the screw 60 and render the spring 55 inoperative.

The control chamber pressure will then act on the diaphragm 31 to effect lesser opening of the pilot valve 29 to hold air until the desired higher differential pressure between that in the control chamber and atmosphere, and hence, the cabin and ambient atmosphere is reached. Thereafter, the higher differential of pressure will be maintained until the switch 88 is opened. With the opening of switch 88 the valve 76 will close and the pressure in chamber 71 will build up to substantially cabin pressure so that the spring 91 will actuate the diaphragm 66, rod 65, and lever 61, so as to allow the spring 55 to again exert its pressure on the differential diaphragm 31. The lower differential between the control chamber pressure and atmosphere, and hence, cabin pressure and ambient atmosphere, will be provided.

We claim:

1. In means for controlling the pressure in a control pressure chamber of a pressure regulating mechanism: pressure responsive means for controlling the pressure in said control chamber; means for loading said pressure responsive means; means for controlling said loading means, including a movable wall responsive to variations in the differential of pressure on opposite sides thereof; means forming a pressure chamber having an inlet passage and an outlet passage, one side of said wall being subjected to pressure in said pressure chamber and the opposite side being subjected to a region of pressure of substantially the same value as the pressure in the pressure chamber, one of said passages being connected with a region of pressure of a different value; and means controlling said one passage for changing the pressure in said pressure chamber to thereby effect actuation of said loading means.

2. A pressure control mechanism for an enclosure, including: pressure control means, including a pressure sensitive element; walls defining a control pressure chamber, one side of said pressure sensitive element being subjected to the pressure in said chamber and the opposite side of said element being subjected to enclosure pressure so that changes in either of said pressures will effect movement of said pressure sensitive element; pressure control means for said control chamber including pressure responsive means subjected on one side to control chamber pressure for controlling the pressure in said chamber; spring means for loading said pressure responsive means; a pressure responsive device for controlling said spring loading means and having a movable wall subjected on one side to the pressure in the control chamber; means defining a pressure chamber, the other side of said wall being subjected to the pressure in said pressure chamber, said pressure chamber having a connection with a source of higher pressure and a connection with a region of lower pressure; and means for controlling one of said connections.

3. The invention defined by claim 2, wherein one of said connections is restricted.

4. The invention defined by claim 2, wherein the connection with the source of higher pressure is restricted and the last mentioned means controls the connection with the region of lower pressure.

5. A pressure control mechanism for an enclosure, including: pressure control means, including a pressure sensitive element; walls defining a control pressure chamber, one side of said pressure sensitive element being subjected to the pressure in said chamber and the opposite side of said element being subjected to enclosure pressure so that changes in either of said pressures will effect movement of said pressure sensitive element; pressure control means for said control chamber including pressure responsive means subjected on one side to control chamber pressure for controlling the pressure in said chamber; spring means for loading said pressure responsive means; a pressure responsive device for controlling said spring loading means and having a movable wall subjected on one side to the pressure in the control chamber; means defining a pressure chamber, the other side of said wall being subjected to the pressure in said pressure chamber, said pressure chamber having a connection with a source of higher pressure and a connection with a region of lower pressure; a valve for controlling one of said connections; and electrical means for controlling said valve.

6. The invention defined by claim 5, including a manually operable switch for controlling the electrical means.

7. Mechanism for controlling the pressure in an enclosure, including: pressure control means including a pressure sensitive element; walls defining a control pressure chamber, one side of said pressure sensitive element being subjected to the pressure in said chamber and the opposite side of said element being subjected to enclosure pressure so that changes in either of said pressures will effect movement of said pressure sensitive element; pressure control means for said control chamber comprising differential pressure responsive means subjected on one side to control chamber pressure and on the opposite side to ambient atmospheric pressure for controlling the pressure in said chamber; spring means for loading said pressure responsive means for changing the effective differential pressure response of said pressure responsive means; means for fully locking out said spring means, said lockout means comprising a movable wall having a connection with said spring means, said movable wall being subjected on one side to the pressure in the control chamber; means defining a pressure chamber, the other side of said wall being subjected to the pressure in said pressure chamber, said pressure chamber having a connection with the enclosure and a connection with ambient atmosphere; and means for controlling one of said connections.

8. Mechanism for controlling the pressure in an enclosure, including: pressure control means including a pressure sensitive element; walls defining a control pressure chamber, one side of said pressure sensitive element being subjected to the pressure in said chamber and the opposite side of said element being subjected to enclosure pressure so that changes in either of said pressures will effect movement of said pressure sensitive element; pressure control means for said control chamber comprising differential pressure responsive means subjected on one side to control chamber pressure and on the opposite side to ambient atmospheric pressure for controlling the pressure in said chamber; spring means for loading said pressure responsive means for changing the effective differential pressure response of said pressure responsive means; and pneumatic means for rendering the spring means inoperative.

9. The invention defined by claim 8, wherein the pneumatic means is controlled by electrical means.

10. Mechanism for controlling the pressure in an enclosure, including: pressure control means including a pressure sensitive element; walls defining a control pressure chamber, one side of said pressure sensitive element being subjected to the pressure in said chamber and the opposite side of said element being subjected to enclosure pressure so that changes in either of said pressures will effect movement of said pressure sensitive element; pressure control means for said control chamber comprising differential pressure responsive means subjected on one side to control chamber pressure and on the opposite side to ambient atmospheric pressure for controlling the pressure in said chamber; spring means for loading said pressure responsive means for changing the effective differential pressure response of said pressure responsive means; means for rendering the spring loading means inoperative, said means including pneumatic lockout means having a control valve; and electrical means for controlling said valve.

11. In mechanism for controlling the pressure in an enclosure: pressure control means, including a pressure sensitive element; walls defining a control pressure chamber, one side of said pressure sensitive element being subjected to the pressure in said chamber and the opposite side of said element being subjected to enclosure pressure so that changes in either of said pressures will effect movement of said pressure sensitive element; pressure control means for said control chamber comprising an absolute pressure responsive device responsive to control chamber pressure for controlling the pressure in said chamber through an isobaric range of operation; a differential pressure responsive device, responsive to the differential of pressure between that in the control chamber and ambient atmosphere for controlling the pressure in said control chamber in a differential range of operation; spring means for loading said differential pressure responsive device for changing the response thereof; and pneumatic means for rendering said spring inoperative with respect to the pressure responsive device.

12. In mechanism for controlling the pressure in an enclosure: pressure control means, including a pressure sensitive element; walls defining a control pressure chamber, one side of said pressure sensitive element being subjected to the pressure in said chamber and the opposite side of said element being subjected to enclosure pressure so that changes in either of said pressures will effect movement of said pressure sensitive element; pressure control means for said control chamber comprising an absolute pressure responsive device responsive to control chamber pressure for controlling the pressure in said chamber through an isobaric range of operation; a differential pressure responsive device, responsive to the differential of pressure between that in the control chamber and ambient atmosphere for controlling the pressure in said control chamber in a differential range of operation; spring means for loading said differential pressure responsive device for changing the response thereof; pneumatic means including a control valve, for disengaging the spring loading means from the differential pressure responsive device; and electrical means for controlling said valve.

13. Mechanism for controlling the pressure in an enclosure, including: pressure control means operable to control the pressure in said enclosure, said pressure control means including a movable pressure sensitive element; walls defining a control pressure chamber, said movable pressure sensitive element being exposed on one side to control chamber pressure and on the other side to enclosure pressure; pressure control means for said control chamber, including pressure responsive means subjected on one side to control chamber pressure for controlling the pressure in said chamber; yielding means for loading said pressure responsive means; and means for rendering the loading means ineffective for loading said pressure responsive means.

14. A pressure control mechanism for an enclosure, including: pressure control means, including a pressure sensitive element; walls defining a control pressure chamber, one side of said pressure sensitive element being subjected to the pressure in said chamber and the opposite side of said element being subjected to enclosure pressure so that changes in either of said pressures will effect movement of said pressure sensitive element; pressure control means for said control chamber including pressure responsive means subjected on one side to control chamber pressure for controlling the pressure in said chamber; means for loading said pressure responsive means; and means for rendering the loading means ineffective for loading said pressure responsive means.

15. A pressure control mechanism for an enclosure, including: pressure control means, including a pressure sensitive element; walls defining a control pressure chamber, one side of said pressure sensitive element being subjected to the pressure in said chamber and the opposite side of said element being subjected to enclosure pressure so that changes in either of said pressures will effect movement of said pressure sensitive element; pressure control means for said control chamber including pressure responsive means subjected on one side to control chamber pressure for controlling the pressure in said chamber; spring means for loading said pressure responsive means; and means for fully locking out the spring means so as to render same ineffective for loading said pressure responsive means.

16. In mechanism for controlling the pressure in an enclosure: pressure control means, including a pressure sensitive element; walls defining a control pressure chamber, one side of said pressure sensitive element being subjected to the pressure in said chamber and the opposite side of said element being subjected to enclosure pressure so that changes in either of said pressures will effect movement of said pressure sensitive element; pressure control means for said control chamber comprising an absolute pressure responsive device responsive to control chamber pressure for controlling the pressure in said chamber through an isobaric range of operation; a differential pressure responsive device, responsive to the differential of pressure between that in the control chamber and ambient atmosphere for controlling the pressure in said control chamber in a differential range of operation; spring means for loading one of said pressure responsive devices for changing the response thereof; and pneumatic means for rendering said spring inoperative with respect to the pressure responsive device.

17. In pressure control mechanism for controlling the pressure in the control chamber of a pressure regulator means, including a movable wall responsive to variations in the differential of pressure on opposite sides thereof, said movable wall being subjected on one side to a pressure to be controlled and on the opposite side to a variable reference pressure; yielding means exerting force on said movable wall; second yielding means operable to exert force on said movable wall; and electrical means for rendering one of said yielding means ineffective to exert force on said wall.

References Cited in the file of this patent

UNITED STATES PATENTS

| Number | Name | Date |
|---|---|---|
| 1,853,194 | Bogle | Apr. 12, 1932 |
| 2,433,206 | Dube | Dec. 23, 1947 |
| 2,463,487 | Widgery et al. | Mar. 1, 1949 |
| 2,463,490 | Kemper | Mar. 1, 1949 |
| 2,498,633 | Arthur | Feb. 28, 1950 |
| 2,590,330 | Krueger | Mar. 25, 1952 |